Fig. 1.

INVENTOR
JAMES JOHN DRAGE

ATTORNEY

Fig. 5.

United States Patent Office 3,398,265
Patented Aug. 20, 1968

3,398,265
ELECTRONIC COUNTER
James John Drage, London, England, assignor to Bell Punch Company Limited, London, England, a British company
Continuation-in-part of application Ser. No. 232,663, Oct. 18, 1962. This application Dec. 10, 1963, Ser. No. 331,335
Claims priority, application Great Britain, Oct. 19, 1961, 37,506/61, 37,507/61
8 Claims. (Cl. 235—92)

ABSTRACT OF THE DISCLOSURE

There is disclosed an electronic ring counter comprising a multi-cathode cold cathode indicating tube with a separate trigger device in series with each of the cathodes of the indicating tube. This trigger device may be either a space discharge or a solid state device or a combination of such devices, in particular, a series combination of a diode rectifier and switching diode, or a solid state switching triode. Capacitative coupling is provided from each cathode of the indicating tube to the trigger electrode of the trigger device in series with the next indicating tube cathode. To shift the glow from one of those cathodes to the next, the indicating tube anode voltage is lowered enough to extinguish the glow at that cathode, held there long enough for deionisation to occur in the trigger device in series with that cathode but not in the indicating tube, and then restored. The small current reestablished at that cathode produces a change of potential which is applied to the trigger device at the next indicating tube cathode, causing that device to conduct, whereby a glow is built up in the indicating tube on that next cathode thereof.

This application is a continuation-in-part of my application Ser. No. 232,663, filed Oct. 18, 1962, which is a continuation-in-part of my application Ser. No. 65,414, filed Oct. 26, 1960, now both abandoned.

This invention relates to electronic counters of the kind which include a plurality of trigger devices coupled to form a series or ring. The term "trigger device" is used herein to define a bi-stable device which can be made to switch between a high-impedance (non-conductive) state and a low-impedance (conductive) state. In such counters only one trigger device is conductive at any one time and the trigger devices are normally rendered conductive in succession by the application of input pulses. One known form of trigger device is a cold-cathode trigger tube and such tubes are rendered conductive by means of a trigger potential applied to the trigger electrode. In known counters which include trigger tubes each trigger tube is operative when it is conducting to prime the next succeeding trigger tube in the series or ring, or to open a gate circuit leading to the trigger electrode of said next succeeding trigger tube. In addition, the trigger tubes are interconnected, so that when any tube is conducting it renders the preceding tube in the series or ring non-conductive.

It is frequently desirable that visual means should be provided to indicate which of the trigger devices is conducting at any instant. The most convenient visual means for this purpose is a multi-cathode cold-cathode indicating tube, for example, such as a tube known commercially as the Nixie HB–106 or the tube known as the Ericsson (registered trademark) Digitron type GRIOG. Such an indicating tube requires a negative potential to be applied to the cathode on which it is desired that the glow should reside and as, when the trigger device is a trigger tube, the anode of the conducting trigger tube is negative with respect to the anodes of the remaining trigger tubes in the series, the required indications can be provided by connecting the anodes of the trigger tubes directly to the respective cathodes of the indicating tube. In such an arrangement the electronic counter functions substantially as it would in the absence of the indicating tube which plays no part in causing the trigger tubes to fire in succession.

It is an object of the invention to provide an electronic counter including a cold-cathode multi-cathode indicating tube in which the number of circuit components required is reduced by utilising the indicating tube as an active element in the counter.

The invention comprises an electronic counter including a multi-cathode, cold-cathode indicating tube and a plurality of trigger devices, one associated with each cathode of the indicating tube, means for reducing the potential of the anode of the indicating tube at the beginning of an input pulse to render any conducting trigger device non-conductive, and for restoring the anode potential of the indicating tube at the end of each input pulse to render the next succeeding trigger device conductive as a result of an electrical quantity applied to it over the still ionised path from the anode of the indicating tube to the cathode associated with the said previously conducting trigger device.

The invention also comprises an electronic counter comprising a multi-cathode cold-cathode indicating tube, a plurality of cold-cathode trigger tubes, one associated with each cathode of the indicating tube, means for causing any conducting trigger tube to be extinguished by an input pulse, and means for firing the next succeeding trigger tube at the end of the input pulse as a result of a triggering potential applied to its trigger electrode over the still ionised path from the anode of the indicating tube to the cathode associated with the said previously conducting trigger tube.

It is an object of a further aspect of the invention to render an electronic counter according to the preceding paragraph more tolerant of variations in the characteristics of the trigger tubes.

From this aspect the invention comprises an electronic counter comprising a multi-cathode cold-cathode indicating tube, a trigger tube in each cathode circuit of the indicating tube, a capacitative coupling between each cathode of the indicating tube and the trigger electrode of the trigger tube in the circuit of the next succeeding cathode of the indicating tube, means for reducing the potential of the anode of the indicating tube in response to input pulses, and means for limiting excursions of the potential of the trigger electrode of each trigger tube in the negative direction.

Preferably said limiting means comprises, or include, an asymmetrically conducting device, for example, a semiconductor diode. Preferably also the anode of each trigger tube is connected through a resistor to a point of positive potential.

The invention also comprises an electronic counter comprising a multi-cathode cold-cathode indicating tube, a solid-state switching triode in each cathode circuit of the indicating tube, the collector of each of said triodes being connected to a respective one of the cathodes of the indicating tube, a potential source connected between the anode of the indicating tube and the emitters of the triodes to render one of said triodes conductive and thus to maintain a glow discharge between the anode of the indicating tube and the cathode that is connected to the collector of the conductive triode, capacitative coupling between each cathode of the indicating tube and the gate electrode of the triode in the circuit of the next succeeding cahode, means for reducing the potential on the anode of the indicating tube so that the conductive triode is rendered nonconducive and for restoring said potential before the end of the deionisation time of the indicating tube so that a triggering pulse is applied to the gate electrode of the next succeeding triode through said capacitative coupling.

The invention also comprises an electronic counter including a multi-cathode cold-cathode indicating tube, a diode rectifier and a switching diode in series in each cathode circuit of the indicating tube, a capacitor connecting the junction between each diode rectifier and switching diode to the preceding cathode of the indicating tube, and a resistor connecting each of said junctions to a source of positive potential which is insufficient to cause the voltage across the switching diode to reach the trigger voltage.

The term "solid-state switching triode" is used herein to define a three-terminal bi-stable semi-conductor device which can be switched from a first state in which the emitter-collector path has a high-impedance to a second state in which the emitter-collector path has a low-impedance by means of a current applied to a gate electrode. In order to ensure that the device switches from the high-impedance state to the low-impedance state, the gate current must reach a predetermined level. Thereafter the gate current has no further control over the emitter-collector impedance, but the device will return to the high-impedance state if the collector current is reduced below the sustaining current. One example of a solid-state switching triode is a p-n-p-n silicon crystal provided with emitter-collector and gate electrodes.

The term "solid-state switching diode" is used herein to define a two terminal bi-stable semi-conductor device which can be made to switch from a first state in which there is a high impedance between the two terminals to a second state in which there is a low impedance between the two terminals. In order to cause the device to switch from the high-impedance state to the low-impedance state the voltage across the two terminals must exceed a predetermined voltage known as the "trigger" voltage. Thereafter the device remains in the low-impedance state even though the voltage between the two terminals drops below the trigger voltage and it will remain in that state as long as the current through the device remains above the predetermined level known as the "sustaining" current. However, if the current drops below the sustaining current, the device will return to the high-impedance state.

Methods of performing the invention will now be described with reference to the accompanying drawings in which.

Figure 1:
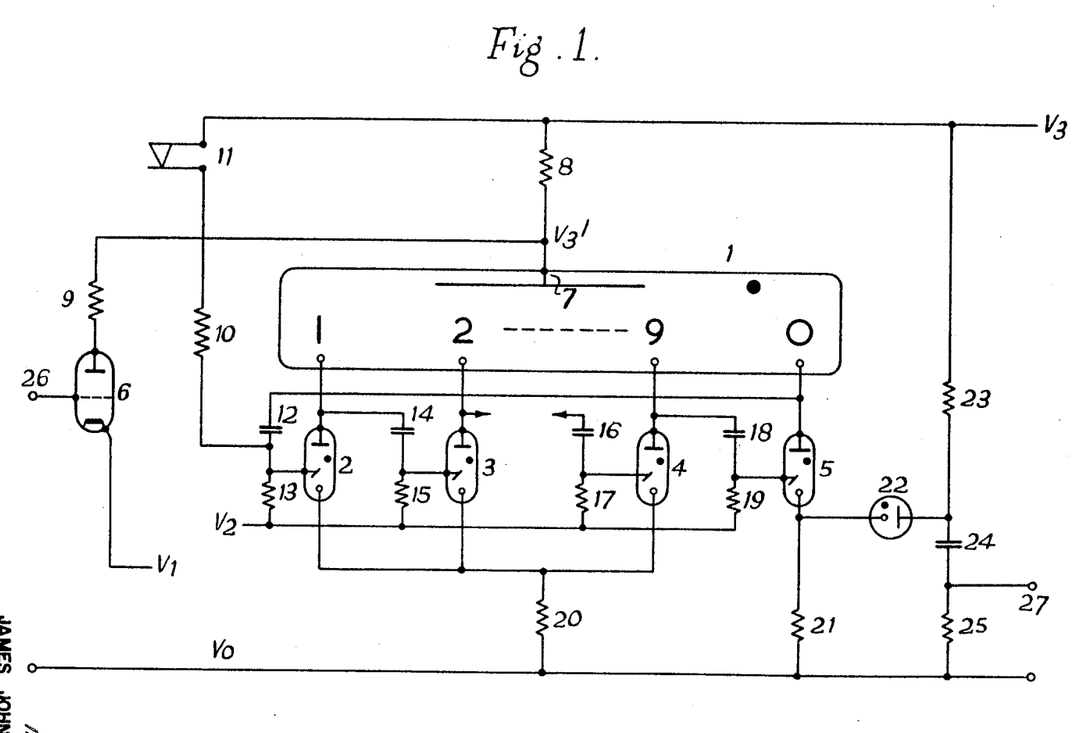
FIGURE 1 is a circuit diagram of one embodiment of the invention.

The ring counter illustrated in FIGURE 1 includes a cold-cathode multi-cathode indicating tube 1 which has its anode 7 connected through a resistor 8 to a source of positive potential V3. The indicating tube 1 has ten cathodes each in the form of one of the numerals 1 to 9 and 0. Only the cathodes which are in the form of the numerals 1, 2, 9 and 0 are illustrated in the drawing.

Each of the cathodes of the indicating tube is connected directly to the anode of a cold-cathode trigger tube or to the collector of a solid-state switching triode. Although the symbols used in the drawing are the conventional symbols for trigger tubes, it is to be understood that they are, in the present context, intended to represent either trigger tubes or solid-state switching triodes as defined hereinbefore. The conventional symbol for the anode of a trigger tube equally represents the collector of a switching triode: the symbol for the cathode represents the emitter: and the symbol for the trigger electrode represents the gate electrode. In the following description only trigger tubes will be referred to, but it is to be understood that such references apply equally to solid-state switching triodes, the names of the corresponding electrode being substituted wherever necessary.

Only trigger tubes 2, 3, 4 and 5 are illustrated in the drawing, these tubes being connected to the cathodes 1, 2, 9 and 0 of the indicating tube respectively. The trigger tubes connected to the cathodes of the indicating tube that are in the form of the numerals 1 to 9 have a common cathode resistor 20, this resistor being connected between the cathodes of said trigger tubes and the negative pole of the voltage source which is indicated by the reference V0. The trigger tube 5, which is connected to the number 0 cathode of the indicating tube, has an individual cathode resistor 21.

The magnitude of the potential difference between V3 and V0 is such that a glow discharge is maintained between the anode and one cathode of the indicating tube and between the anode and the cathode of the associated trigger tube. The potential drop (V3–V3′) in the resistor 8 regulates the discharge current to a value such that the cathode of the indicating tube to which the discharge current is flowing is adequately covered by the glow. The values of the resistors 20 and 21 are such that the potentials dropped across these resistors are small compared with that dropped in the resistor 8.

The anode of each trigger tube is capacitively coupled to the trigger electrode of the next succeeding trigger tube in the ring. Thus, a capacitor 14 connects the anode of the trigger tube 2 to the trigger electrode of the trigger tube 3; a capacitor 16 connects the trigger electrode of the trigger tube 4 to the anode of the preceding trigger tube; a capacitor 18 connects the anode of the trigger tube 4 to the trigger electrode of the trigger tube 5; and a capacitor 12 connects the anode of the trigger tube 5 to the trigger electrode of the trigger tube 2. In addition, each trigger electrode is returned to a source of bias potential V2 through an individual resistor. Thus, resistors 13, 15, 17 and 19 are illustrated in the trigger electrode circuits of the trigger tubes 2, 3, 4 and 5 respectively. The value of the potential V2 is such that the potential between the trigger electrode and the cathode of each trigger tube is normally below the value required for breaking down the gap between the trigger electrode and the cathode.

When the potential V3 is first applied, the gap between the anode 7 and one of the cathodes of the indicating tube is broken down, as also is the anode cathode gap in one of the trigger tubes. The resulting potential fall at the anode 7 limits the discharge in the indicating tube to one cathode. The glow may then be stepped from one cathode of the indicating tube to the next by means of an input pulse applied to a terminal 26.

Figure 2:
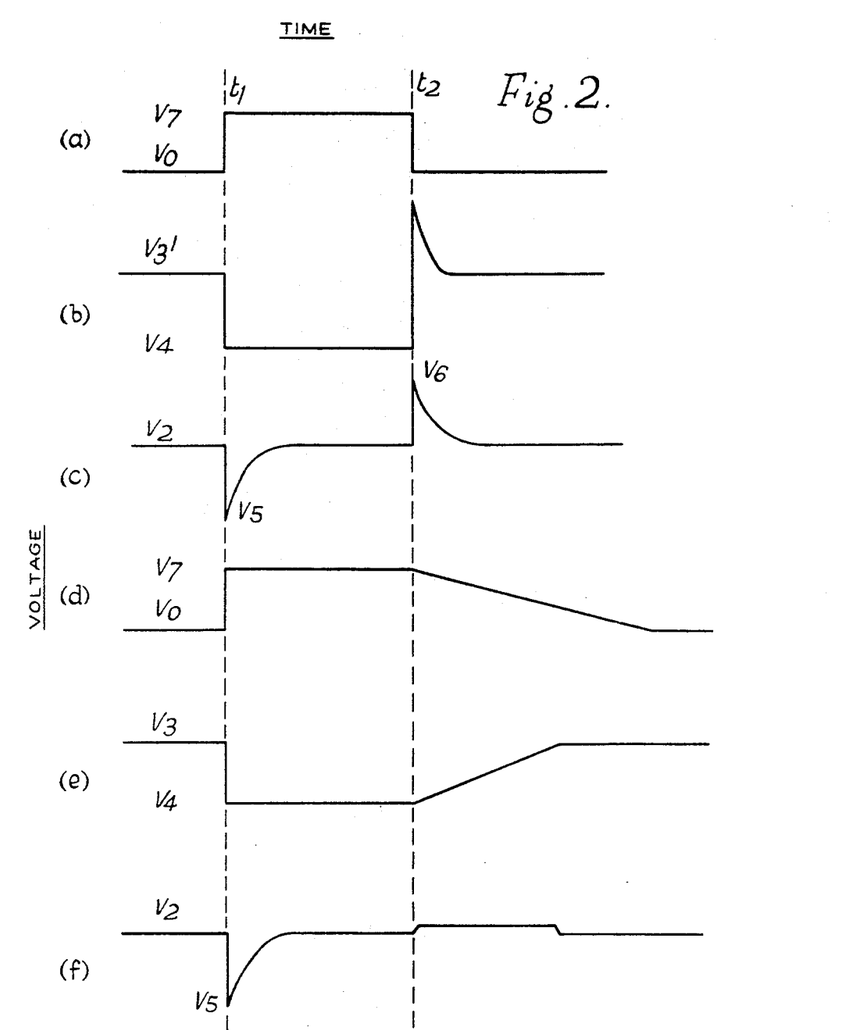
FIGURES 2 and 3 are time-voltage diagrams illustrating the operation of the circuit illustrated in FIGURE 1.

The terminal 26 is connected to the grid of a thermionic triode valve 6, the anode of which is connected through a resistor 9 to the anode 7 of the indicating tube. The cathode of the thermionic valve 6 is connected to a bias source V1, the potential of which is such that, if the terminal 26 is at the potential V0, the valve 6 will pass no current. If, however, the potential of the terminal 26 is raised to V7, as indicated by waveform $a$ in FIGURE 2, the valve 6 will become conductive. If the input pulse has a duration from $t1$ to $t2$, as illustrated in wave-form $a$, the potential at the anode 7 of the indicating tube 1 will vary in accordance with wave-form $b$ of FIGURE 2. It will be seen that the anode potential initially drops, as a result of the additional current flowing through resistors 8 and 9 and the anode-cathode path of the valve 6, to a value V4 which is sufficiently far below the normal anode potential V3′ to ensure that the potential difference across the two series gaps of the indicating tube and the trigger tube associated with the previously glowing cathode is now too low to maintain the discharge across these gaps. The difference between the potentials V3' and V4 exceeds the potential normally dropped in the resistor 20 (or 21) and the period $t1$ to $t2$ is longer than the de-ionisation time of the trigger tubes but shorter than the de-ionisation time of the indicating tube.

At time $t2$ the valve 6 ceases to conduct so that its anode potential rises and, as at this time there is no trigger tube that is conductive, the potential of the anode 7 rises to a value between V3' and V3. Assuming that the trigger tube 2 was initially conductive, there will be a remanent ionised path between the anode 7 and the number 1 cathode of the indicating tube. Accordingly as the anode potential of the indicating tube rises, a small current flows to the cathode 1 with the result that the potential of this cathode rises with that of the anode 7. The change of potential of the number 1 cathode is applied through the capacitor 14 to the trigger electrode of the trigger tube 3. As the time constant 14, 15 is small compared with the period $t1$ to $t2$, the wave-form across the resistor 15 is as shown at $c$ in FIGURE 2. The negative excursion to V5 at $t1$ has no effect but the positive excursion to V6 at $t2$ is large enough to fire the gap between the trigger electrode and the cathode of the trigger tube 3 with the result that the main gap of this trigger tube and the gap between the anode 7 and the number 2 cathode of the indicating tube also break down. Thus, the number 2 cathode is illuminated and the potential of the anode 7 again falls to V3'. The small current flowing to the number 1 cathode continues to fall in value as the potential of this cathode rises towards that of the anode 7.

The process described above results in the replacement of the trigger tube 2 by the trigger tube 3 as the conductive tube in the ring counter and in the stepping of the glow from the number 1 cathode of the indicating tube to the number 2 cathode. A further input pulse will cause the glow to step to the number 3 cathode and so on to the number 0 cathode, after which the glow will be returned to the number 1 cathode.

In order to ensure that the glow appears on the number 1 cathode as a result of the first input pulse applied to the counter, a zero key switch 11 is provided. One of the normally open contacts of this switch is connected to the source of positive potential V3 and the other contact is connected through a resistor 10 to the trigger electrode of the trigger tube 2. If the indicating tube has previously had one of its cathodes illuminated, it is necessary to apply a modified input pulse in order to ensure that the glow appears on the number 1 cathode and not on the cathode succeeding the one that was previously illuminated. The wave-form of the modified input pulse is illustrated at $d$ in FIGURE 2 from which it can be seen that the sharp trailing edge of the pulse illustrated at $a$ is replaced by a gradual decay. Such an input pulse causes the potential of the anode 7 of the indicating tube 1 to vary in accordance with the wave-form $e$ in FIGURE 2. The gradual increase of the anode potential causes an equivalent gradual increase of the potential of the previously illuminated cathode and the rate of change of this cathode potential is so related to the time constant 14, 15 (or 16, 17 or 18, 19) that the potential of the respective trigger electrode is not raised sufficiently to fire the gap between it and its associated cathode. Thus, it is ensured that the trigger tube 2 will fire when the zero key switch 11 is closed and the modified input pulse is applied to the terminal 26.

A carry pulse may be taken from across the resistor 21 but such a carry pulse would have a substantially square wave-form with a duration equal to the interval between input pulses. Such a carry pulse may well be unsuitable for application to the input of a further counter of the kind described and illustrated herein, either because it is too long if the counter is being operated at a low speed, or because, it is too short, if the speed of operation of the counter is high. Accordingly, a difference diode 22, resistors 23 and 25 and a capacitor 24 are provided to generate a modified carry pulse on an output terminal 27. The circuit illustrated may be designed to operate either as a pulse-shortening circuit or as a pulse-lengthening circuit. The difference diode 22 may, for example, be of the type known as the Hivac XC20, but the actual type used will in each case depend on the required function of the circuit. In either case, however, the de-ionisation time of the diode should be less than the length of the shortest pulse produced across the resistor 21. In the following description it will be assumed that the speed of operation of the counter is comparatively low so that the pulse across the resistor 21 is too long.

When the trigger tube 5 is not conducting, a small current (for example 100 microamperes) flows through the resistor 23, the diode 22 and the resistor 21. The potential across the diode 22 is then equal to the maintaining potential for the particular tube being used. The potential drop across the resistor 21 is illustrated by the potential V8 in the wave-form $a$ of FIGURE 3 and the potential of the anode of the diode 22 is therefore equal to V8 plus the maintaining potential of the diode. This potential is illustrated by V10 in wave-form $b$ of FIGURE 3. Under static conditions the output terminal 27 is at earth potential so that the capacitor 24 is charged to the potential V10.

Figure 3:
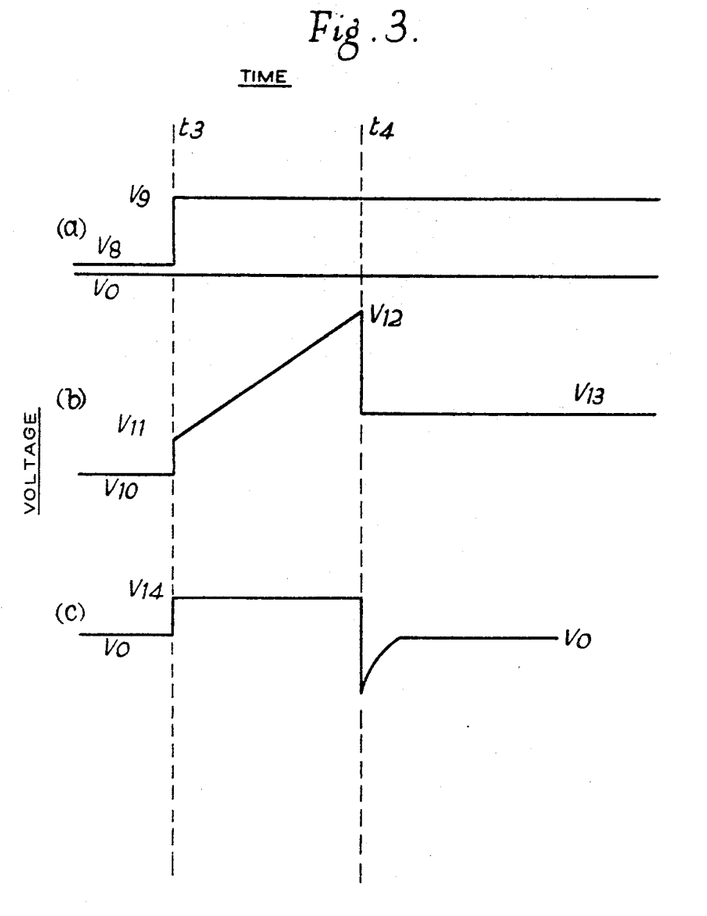

It is assumed that the trigger tube V5 becomes conductive at the time $t3$ with the result that the potential drop in the resistor 21 is increased to V9 as illustrated in the wave-form $a$ of FIGURE 3. The potential difference V10−V9 is below the maintaining potential of the diode and accordingly current ceases to flow through the diode. The potential of the anode of the diode rises to V11, which potential of the anode of the diode rises to V11, which potential is determined by the potential drop across the resistor 25 due to the current flowing through the resistors 23 and 25 as a result of the potential difference V3−V10. This potential drop across the resistor 25 is illustrated as V14 in wave-form $c$ of FIGURE 3.

The current flowing through resistors 23 and 25 charges the capacitor 24 so that the potential of the anode of the diode 22 rises substantially linearly from V11 to V12 as shown in wave-form $b$. During the charging of the capacitor the current through the resistor 25 is substantially constant so that the potential of the carry pulse is also constant as illustrated in wave-form $c$.

When the potential of the anode of the diode reaches V12 at time $t4$, the potential difference between the anode and the cathode of the diode becomes sufficient to break down the anode-cathode gap with the result that the anode potential drops abruptly to V13. The potential difference V13−V10 is equal to the potential difference V9−V8 so that the potential across the diode is equal to the maintaining potential as under the starting conditions.

The abrupt fall of the anode potential of the diode is transmitted through the capacitor 24 to the output terminal 27 so that the trailing edge of the carry pulse is substantially vertical. The capacitor 24 then charges until the potential across it returns to V10 with the result that the potential of the terminal 27 returns to V0. The carry pulse illustrated in wave-form $c$ is particularly suitable for use as an input pulse to a further counter of the kind illustrated because the sharp trailing edge generates a reliable firing pulse for the next trigger tube to fire.

It is to be understood that there are many modifications of the circuit illustrated in FIGURE 1 which fall within the claims of this specification. In particular, it is possible to arrange the trigger tubes in such a way that less than ten are required for a decade counter. In one such modification five trigger tubes are used. The indicating tube has two anodes and each of the five trigger tubes is associated with two cathodes of the indicating tube. Suitable switching means are provided to change over from one anode with its associated set of cathodes to the other anode and its associated set of cathodes. It is also to be understood that a number of cold-cathode indicating tubes may be used instead of a single multi-cathode tube, since it is unnecessary that all the further discharge paths be located in the same envelope.

Figure 4:
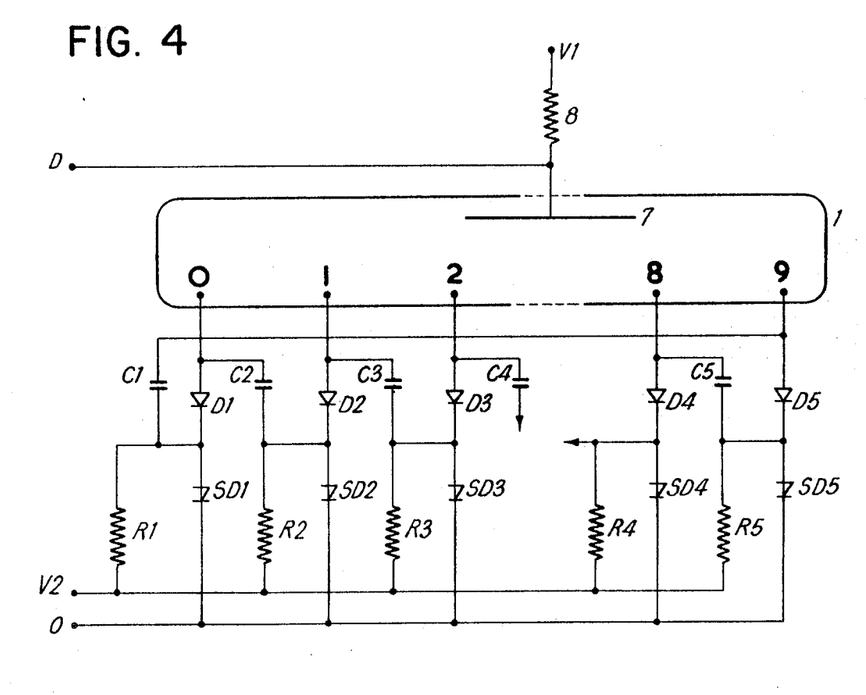
FIGURE 4 is a circuit diagram of a further embodiment of the invention.

A further embodiment of the invention utilising solid-state switching diodes in place of trigger tubes or solid-state switching triodes is illustrated in FIGURE 4.

The ring counter illustrated in FIGURE 4 includes a cold-cathode multi-cathode indicating tube 1 which has its anode 7 connected to a terminal D and through a resistor 8 to a source of positive potential V1. The indicating tube 1 has ten cathodes each in the form of one of the numerals 0 to 9, but only the cathodes which are in the form of the numerals 0, 1, 2, 8 and 9 are illustrated in the drawing.

Each of the cathodes of the indicating tube is connected to the anode of a diode rectifier, but only rectifiers D1, D2, D3, D4 and D5 are illustrated in the drawings, these rectifiers being connected to the number nought, number one, number two, number eight and number nine cathodes of the indicating tube respectively. The cathode of each of these diode rectifiers is connected to the anode of a switching diode. Only switching diodes SD1, SD2, SD3, SD4 and SD5 are illustrated in the drawing, these diodes being connected to the cathodes of the rectifiers D1, D2, D3, D4 and D5 respectively. The cathodes of all the switching diodes are connected to a point of zero potential.

Each of the switching diodes is a p-n-p-n silicon junction diode; the term "anode" is used herein to define the external p-type region and the term "cathode" is used herein to define the external n-type region. The anode is normally positive with respect to the cathode and thus the two outer p-n junctions are forwardly biassed and the middle n-p junction is reverse biassed. Thus, so long as the reverse voltage across the middle junction is below a predetermined level, the diode is non-conductive. However, the characteristics of a switching diode are such that the middle junction breaks down and becomes conductive when the reverse voltage across it exceeds the predetermined level (trigger voltage). Further the middle junction remains conductive so long as the current through it is maintained above a predetermined level (sustaining current).

The junction between the cathode of the diode rectifier D1 and the anode of the switching diode SD1 is connected through a resistor R1 to a source of positive potential V2 and through a capacitor C1 to the number nine cathode of the indicating tube. Similarly the junction between the diode rectifier and the switching diode in each of the other cathode circuits of the indicating tube is connected through a respective resistor to the terminal V2 and through a respective capacitor to the preceding cathode of the indicating tube. Only the resistors R1 to R5 and the capacitors C1 to C5 are illustrated.

The potential difference between the terminals V2 and 0 is insufficient in itself to cause the potential across any of the switching diodes SD1 to SD5 to reach the trigger voltage. For the purposes of explanation it will be assumed that the trigger voltage is 100 volts and the potential of V2 is 75 volts. However, the potential difference between the terminal V1 and 0 is sufficient to cause the gap between the anode 7 of the indicating tube 1 and one of the cathodes of that tube to break down and to apply a voltage across the corresponding switching diode sufficient to cause that diode to become conductive. Further the value of the resistor 8 is so related to the potential difference between V1 and 0 that a glow discharge is maintained between the anode 7 and one cathode of the indicating tube. It will be assumed that the potential of V1 is such that the potential of the anode 7 is normally maintained at approximately 120 volts.

In use the glow discharge is caused to step from one cathode of the indicating tube 1 to the next cathode by means of negative-going pulses applied to the terminal D. These negative-going drive pulses have an amplitude, for example, of 50 volts. In order to explain the manner in which the circuit operates to produce this stepping of the glow, it will be assumed that a glow discharge is being maintained between the anode and the number nought cathode of the indicating tube. In this condition the switching diode SD1 will be in the conductive state and the switching diodes SD2 to SD5 will be in the non-conductive state.

Thus the potential of the number nought cathode will be only slightly above zero volts, whereas the remaining cathodes will drift up to about 75 volts. Thus the capacitor C1 will be charged with its upper (in the drawing) plate positive with respect to its lower plate; C2 will be charged with its lower plate positive with respect to its upper plate; and all the remaining capacitors will be substantially uncharged.

When a negative pulse is applied to the terminal D, the potential of the anode 7 will drop and the remanent ionisation of the gap between the anode and the number nought cathode will cause the potential of the number nought cathode to drop to approximately −50 volts. Accordingly the current through the diode rectifier D1 and the switching diode SD1 drops below the sustaining current and the switching diode SD1 is changed over to the non-conductive state. The potential of the number nought cathode remains at substantially −50 volts throughout the length of the input pulse and accordingly during this period the capacitor C2 is charged by current flowing from the terminal V2 through the resistor R2. The time constant of the R-C combination R2C2 is so related to the length of the input pulse that by the end of the input pulse the potential across the capacitor C2 has risen to at least 100 volts. At the end of the drive pulse the potential of the anode 7 rises by at least 50 volts and owing to the remanent ionisation between the anode and the number nought cathode, the potential of that cathode rises to zero volts. Accordingly the potential across the switching diode SD2 is raised to at least 100 volts so that this diode is changed over to its conductive state. Thus the potential of the cathode of the diode rectifier D2 is reduced almost to zero volts and the potential of the anode of this rectifier and hence of the number one cathode of the indicating tube necessarily follows this reduction. Further, since the capacitor C2 is charged with its lower plate approximately 100 volts positive with respect to its upper plate, the potential of the nought cathode drops to −100 volts. As a result current flows across the still ionised path from the anode of the indicating tube to the number nought cathode and thence through the capacitor C2 and the conductive switching diode SD2. There is no path for this current through the diode rectifier D1 and the switching diode SD1 since this latter diode remains in the non-conductive state.

The current through the capacitor C2 causes it to discharge and the potential of the number nought cathode rises until it eventually becomes positive. Thus the capacitor C2 commences to charge with its upper plate positive with respect to its lower plate. The discharging and charging currents of the capacitor C2 both flow through the switching diode SD2 and each is above the sustaining current for this diode. When the potential of the number nought cathode rises above zero, the number one cathode becomes the most negative cathode in the indicating tube and accordingly the glow discharge transfers to it. A small current continues to flow to the number nought cathode and through the switching diode SD2 until the potential of this cathode rises to about −75 volts.

The process described above results in the replacement of the switching diode SD1 by the switching diode SD2 as the conductive trigger device in the ring counter and in the replacement of the number nought cathode by the number one cathode as the glowing cathode in the indicating tube. A further input pulse will cause the glow to step from the number one cathode to the number two cathode and so on to the number nine cathode, after which the glow will be returned to the number nought cathode.

Means, not illustrated, may be provided to ensure that, when the counter is in the waiting condition, the glow is maintained on the number nought cathode. This result may be obtained, for example, by connecting the cathodes of all the switching diodes except SD1 to a line, the potential of which can be raised to a potential high enough to ensure that any glowing cathode is extinguished and by providing means for applying an external triggering potential to switching diode SD1.

If it is desired to obtain an electrical signal when a particular cathode of the indicating tube is glowing, a resistor may be inserted between the cathode of the associated switching diode and the zero potential line.

A modification of the electronic counter illustrated in FIGURE 1 which is more tolerant of variations in the characteristics of the trigger tubes will now be described with reference to FIGURES 5 and 6 of the accompanying drawings.

Figure 5:
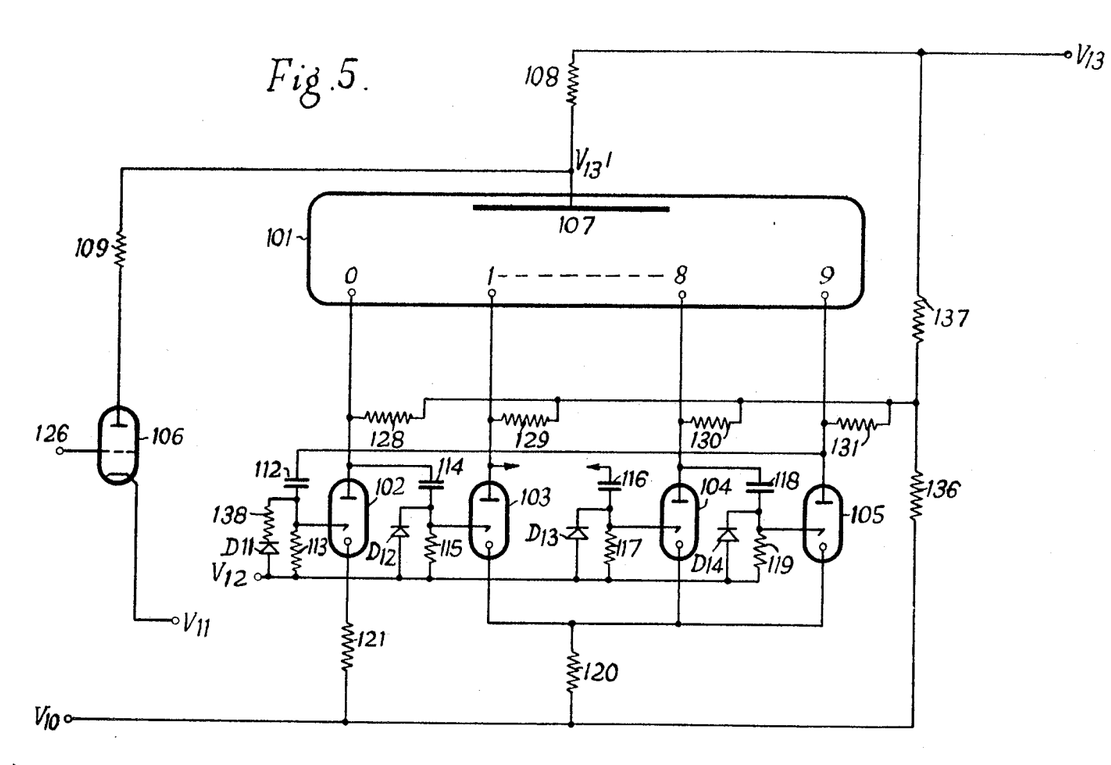
FIGURE 5 is a circuit diagram of modified form of the embodiment illustrated in FIGURE 1.

The ring counter illustrated in FIGURE 5 includes a cold-cathode multi-cathode indicating tube 101 which has its anode 107 connected through a resistor 108 to a source of positive potential V13. The indicating tube 101 has ten cathodes each in the form of one of the numerals 0 to 9. Only the cathodes which are in the form of the numerals 0, 1, 8 and 9 are illustrated in the drawing.

Each of the cathodes of the indicating tube is connected directly to the anode of a cold-cathode trigger tube. Only trigger tubes 102, 103, 104 and 105 are illustrated in the drawing, these tubes being connected to the numerals 0, 1, 8 and 9 are illustrated in the drawing.

The trigger tubes connected to the cathodes of the indicating tube that are in the form of the numerals 1 to 9 have a common cathode resistor 120, this resistor being connected between the cathodes of said trigger tubes and the negative pole of the voltage source which is indicated by the reference V10. The trigger tube 102 which is connected to the number 0 cathode of the indicating tube has an individual cathode resistor 121.

The magnitude of the potential difference between V13 and V10 is such that a glow discharge is maintained between the anode and one cathode of the indicating tube and between the anode and the cathode of the associated trigger tube. The potential drop (V13–V13') in the resistor 108 regulates the discharge currents to a value such that the cathode of the indicating tube to which the discharge current is flowing is adequately covered by the glow. The values of the resistors 120 and 121 are such that the potentials dropped across these resistors are small compared with that dropped in the resistor 108.

The anode of each trigger tube is capacitatively coupled to the trigger electrode of the next succeeding trigger tube in the ring. Thus, a capacitor 114 connects the anode of the trigger tube 102 to the trigger electrode of the trigger tube 103; a capacitor 116 connects the trigger electrode of the trigger tube 104 to the anode of the preceding trigger tube; a capacitor 118 connects the anode of the trigger tube 104 to the trigger electrode of the trigger tube 105; and a capacitor 112 connects the anode of the trigger tube 105 to the trigger electrode of the trigger tube 102. In addition, each trigger electrode is returned to a source of bias potential V12 through an individual resistor. Thus, resistors 113, 115, 117 and 119 are illustrated in the trigger electrode circuits of the trigger tubes 102, 103, 104 and 105 respectively. The value of the potential V12 is such that the potential between the trigger electrode and the cathode of each trigger tube is normally below the value required for breaking down the gap between the trigger electrode and the cathode. Each of the resistors connected to the trigger electrodes is shunted by a diode rectifier, the rectifiers D12, D13 and D14 are illustrated in parallel with resistors 115, 117 and 119 respectively. Further, the series combination of a resistor 138 and a diode rectifier D11 is shown in parallel with the resistor 113.

When the potential V13 is first applied, the gap between the anode 107 and one of the cathodes of the indicating tube is broken down, as also is the anode-cathode gap in one of the trigger tubes. The resulting potential fall at the anode 107 limits the discharge in the indicating tube to one cathode. The glow may then be stepped from one cathode of the indicating tube to the next by means of an input pulse applied to a terminal 126.

The anode of each trigger tube is connected through a respective resistor to the junction between resistors 136 and 137 which are connected in series between V13 and V10. Thus a resistor 128 is connected to the anode of trigger tube 102, a resistor 129 to the anode of trigger tube 103, a resistor 130 to the anode of trigger tube 104, and a resistor 131 to the anode of trigger tube 105. The values of the resistors 136 and 137 are so related that their junction is at a positive potential (V19) of about 300 volts. The values of the resistors 128 to 131 are very much higher than thoses of the resistors 113, 115, 117 and 119.

The terminal 126 is connected to the grid of a thermionic triode valve 106, the anode of which is connected through a resistor 109 to the anode 107 of the indicating tube. The cathode of the thermionic valve 106 is connected to a bias source V11, the potential of which is such that, if the terminal 126 is at the potential V10, the valve 106 will pass no current. If, however, the potential of the terminal 126 is raised to V17, as indicated by the wave-form $a$ in FIGURE 6, the valve 106 will become conductive. If the input pulse has a duration from $t11$ to $t12$, as illustrated in wave-form $a$, the potential at the anode 107 of the indicating tube will vary in accordance with the wave-form $b$ of FIGURE 6. It will be seen that the indicating tube anode potential initially drops, as a result of the additional current flowing through resistors 108 and 109 and the anode-cathode path of the valve 106, to a value V14 which is sufficiently far below the normal anode potential V12' to ensure that the potential difference across the two series gaps of the indicating tube and the trigger tube associated with the previously glowing cathode is now too low to maintain the discharge across these gaps. The difference between the potentials V13' and V14 exceeds the potential normally dropped in the resistor 120 (or 121) and the period $t11$ to $t12$ is longer than the de-ionisation time of the trigger tubes but shorter than the de-ionisation times of the indicating tube.

Assuming that the trigger tube 102 is initially conductive, the capacitor 114 will be charged with its upper plate at a potenial (V18) of about 180 volts positive and its lower plate substantially at the potential V12. When the potential of the anode 107 of the indicating tube falls, the capacitor 114 will discharge rapidly through the low impedance circuit consisting of the anode-cathode path of the trigger tube 102, the resistor 121 and the diode D12. As a result of the rapid discharge of the capacitor 114 the potential of the anode of the trigger tube 102 drops rapidly and when this potential falls below the maintaining voltage of the tube 102 this tube ceases to conduct. During the discharge of the capacitor 114 the potential of the trigger electrode of the trigger tube 103 is maintained substantially at the potential V12, as shown in wave-form $d$ in FIGURE 6. When the trigger tube 102 ceases to conduct, the capacitor 114 will commence to re-charge through resistor 128, but the time constant 114.128 is so high that there is no appreciable rise in the voltage across the capacitor 114 by $t12$.

Figure 6:
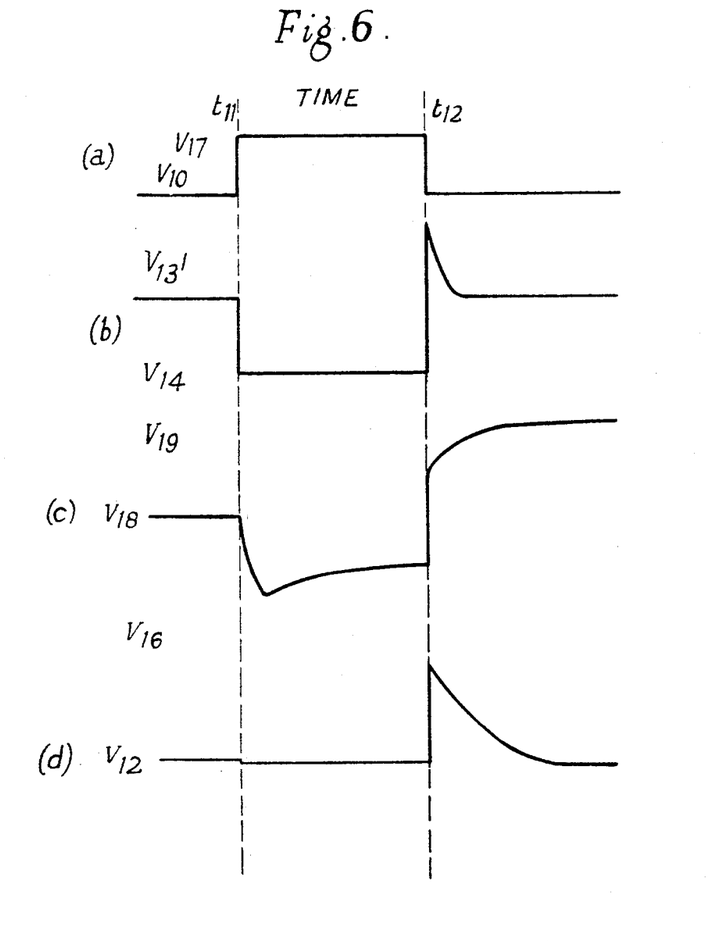
FIGURE 6 is a time-voltage diagram illustrating the operation of the circuit of FIGURE 5.

At time $t12$ the valve 106 cease to conduct so that its anode potential rises and, as at this time there is no trigger tube that is conductive, the potential of the anode 107 rises to a value between V13′ and V13 as shown in wave-form *b* of FIGURE 6. At this time the path between the anode 107 and the number 0 cathode of the indicating tube is still ionised and accordingly, as the anode potential of the indicating tube rises, a small current flows to the number 0 cathode with the result that the potential of this cathode rises with that of the anode 107. This rise of potential is applied through the capacitor 114 to the trigger electrode of the trigger tube 103. The potential of the lower plate of the capacitor 114 and hence that of the trigger electrode of the tube 103 rises to V16 (wave-form *d*, FIGURE 6) and the gap between the trigger electrode and the cathode of tube 103 breaks down with the result that the main gap of this trigger tube and the gap between the anode of the indicating tube and its number 1 cathode also break down. Thus, the number 1 cathode of the indicating tube is illuminated and the potential of the anode 107 again falls to V13′. The capacitor 114 recharges initially through the resistor 115 and the still ionised path between the anode 107 and the number 0 cathode. The time constant 114.115 is large compared with the time constant 114.D12 but small compared with the time *t*11 to *t*12, so that the voltage across the resistor 15 decays as shown in wave-form *d* of FIGURE 6. When the path between the anode 107 and the number 0 cathode ceases to be ionised, the capacitor 114 continues to charge at a very much slower rate through the resistor 128, until the lower plate of the capacitor is substantially at V12 and the upper plate is at V19.

It will be appreciated that at time *t*11 the anode of each of the trigger tubes except the conducting trigger tube 102 will be at the potential V19 so that each of the coupling capacitors except capacitor 114 will be charged to a potential of (V19–V12). The reduction in the potential of the anode 107 of the indicating tube 101 will have substantially no effect on the potential of the anode of any of the non-conducting trigger tubes and there will be substantially no change in the charge on any of the coupling capacitors except capacitor 114. Thus, even if there is any tendency for the potential of any of the cathodes other than the zero cathode of the indicating tube to rise with the potential of the anode 107 at time *t*12, the magnitude of any change in potential will be very small so that any pulse applied to the trigger electrode of any trigger tube other than tube 103 will be too small to break down the trigger electrode-cathode gap of that trigger tube.

The process described above results in the replacement of the trigger tube 102 by the trigger tube 103 as the conductive tube in the ring counter and in the stepping of the glow from the zero cathode of the indicating tube to the number 1 cathode. A further input pulse will cause the glow to step to the number 2 cathode and so on to the number 9 cathode, after which the glow will be returned to the zero cathode.

Figure 7:
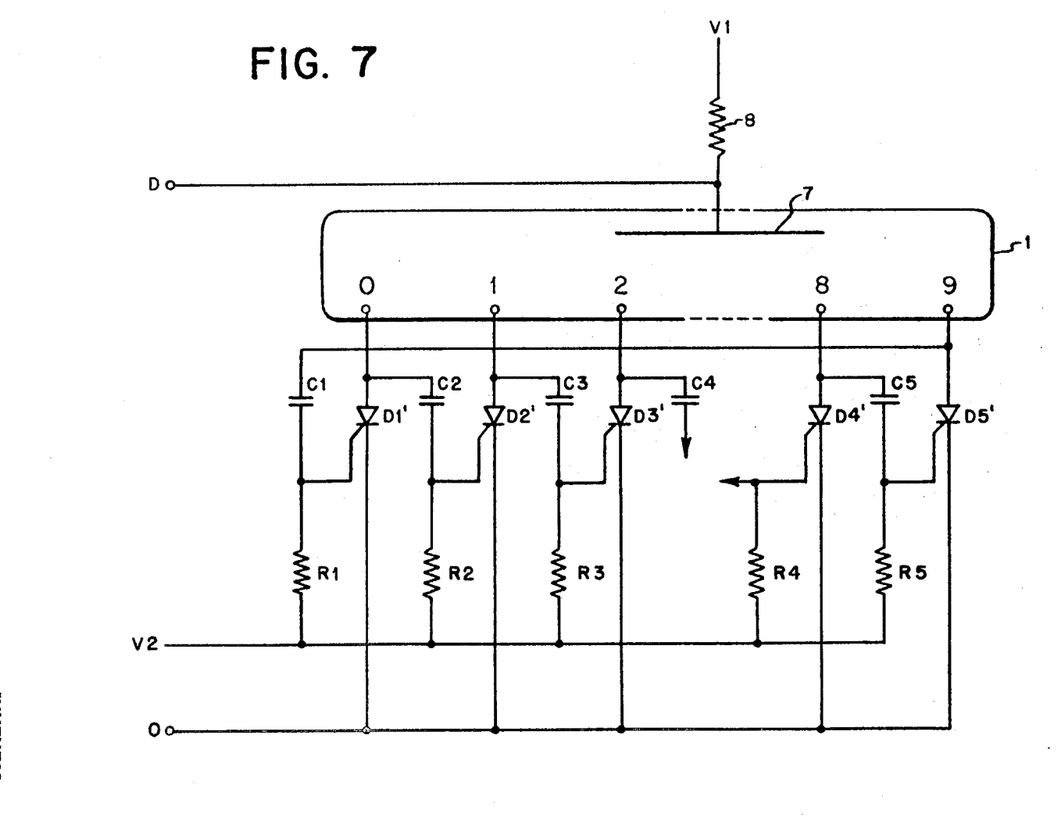
FIGURE 7 is a circuit diagram of still another embodiment of the invention.

FIG. 7 is a circuit diagram of an embodiment similar to that of FIG. 4 except that in FIG. 7 each of the series combinations of a diode rectifier and switching diode (such as the diode D1 and switching diode SD1 in series with the NOUGHT cathode of the indicating tube 1 of FIG. 4) has been replaced with a solid state switching triode. These devices are shown at D1′ through D5′ in FIG. 7, in the cathode circuits of the nought, one, two, eight and nine cathodes shown of the indicating tube 1. These switching triodes are connected, as to the collector, emitter and gate electrodes thereof, in the manner hereinabove set forth. That is, the collector electrode is connected to the associated indicating tube cathode while the emitter is connected to the terminal 0 so that a potential source (that of the voltage V1) is connected between the anode of the indicating tube 1 and the emitter electrode of each triode. Further, each cathode of the indicating tube is connected via capacitative coupling, as shown at C1 through C5 in FIG. 7, to the gate electrode of the triode in series with the next cathode of the indicating tube 1.

What I claim as my invention and desire to secure by Letters Patent of the United States is:

1. An electronic counter comprising a multi-cathode cold-cathode indicating tube, a cold cathode trigger tube in each cathode circuit of the indicating tube, the anode of each of said trigger tubes being connected to a respective one of the cathodes of the indicating tube, a potential source connected between the anode of the indicating tube and the cathodes of the trigger tubes to render one of said trigger tubes conductive and thus to maintain a glow discharge between the anode of the indicating tube and the cathode that is connected to the anode of the conductive trigger tube, capacitive coupling between each cathode of the indicating tube and the trigger electrode of the trigger tube in the circuit of the next succeeding cathode, and means for reducing the potential on the anode of the indicating tube so that the conductive trigger tube is rendered non-conductive and for restoring said potential before the end of the deionisation time of the indicating tube so that a triggering pulse is applied to the trigger electrode of the next trigger tube through said capacitive coupling.

2. An electronic counter as claimed in claim 1, further including means for limiting excursions of the potential of the trigger electrode of each trigger tube in the negative direction.

3. An electronic counter as claimed in claim 2, wherein the means for limiting excursions comprise asymmetrically-conducting devices connected between the trigger electrode of each trigger tube and a source of bias potential.

4. An electronic counter comprising a multi-cathode cold-cathode indicating tube, a trigger tube in each cathode circuit of the indicating tube, the anode of each of said trigger tubes being connected to a respective one of the cathodes of the indicating tube, a potential source connected between the anode of the indicating tube and the cathodes of the trigger tubes to render one of said trigger tubes conductive and thus to maintain a glow discharge between the anode of the indicating tube and the cathode that is connected to the anode of the conductive trigger tube, capacitive coupling between each cathode of the indicating tube except the last and the trigger electrode of the trigger tube in the circuit of the next succeeding cathode of the indicating tube, capacitive coupling between the last cathode of the indicating tube and the trigger electrode of the trigger tube in the circuit of the first cathode of the indicating tube, an electronic valve the anode-cathode path of which is connected between the anode of the indicating tube and a point of low potential and which is normally non-conducting, and input means for applying pulses to the control electrode of said valve to render it conductive.

5. An electronic counter including a multi-cathode cold-cathode indicating tube, a diode rectifier and a solid-state switching diode in series in each cathode circuit of the indicating tube, the anode of each of said diode rectifiers being connected to a respective one of the cathodes of the indicating tube and the cathode of each of said diode rectifiers being connected to the anode of the switching diode in series therewith, a potential source connected between the anode of the indicating tube and the cathodes of the switching diodes to render one of said switching diodes conductive and thus to maintain a glow discharge between the anode of the indicating tube and the cathode of the indicating tube that has the conductive switching diode in its circuit, a capacitor connecting the anode of each switching diode to the preceding cathode of the indicating tube, and a resistor connecting the anode of each switching diode to a source of positive potential which is insufficient to cause the voltage across the switching diode to reach its trigger voltage, means for reducing the potential on the anode of the indicating tube so that the conductive switching diode is rendered non-conductive and for restoring said potential before the end of the deionisation time of the indicating tube so that a triggering pulse is applied to the cathode of the next switching diode through the respective capacitor.

6. An electrode counter comprising a multi-cathode cold-cathode indicating tube, a solid-state switching triode in each cathode circuit of the indicating tube the collector of each of said triodes being connected to a respective one of the cathodes of the indicating tube, a potential source connected between the anode of the indicating tube and the emitters of the triodes to render one of said triodes conductive and thus to maintain a glow discharge between the anode of the indicating tube and the cathode that is connected to the collector of the conductive triode, means providing capacitive coupling between each cathode of the indicating tube and the gate electrode of the triode in the circuit of the next succeeding cathode, and means for reducing the potential on the anode of the indicating tube so that the conductive triode is rendered non-conductive and for restoring said potential before the end of the de-ionisation time of the indicating tube so that a triggering pulse is applied to the gate electrode of the next switching triode through said capacitive coupling.

7. An electronic ring counter comprising a multi-cathode cold-cathode indicating tube, a trigger tube connected in each cathode circuit of the indicating tube, a capacitive coupling between each cathode of the indicating tube except the last and the trigger electrode of the trigger tube in the circuit of the next succeeding cathode of the indicating tube, a capacitive coupling between the last cathode of the indicating tube and the trigger electrode of the trigger tube in the circuit of the first cathode of the indicating tube, an electronic valve the anode-cathode path of which is connected between the anode of the indicating tube and a point of low potential, bias means for rendering the said electronic valve non-conducting, input means for applying pulses to the control electrode of said valve to render it conductive, further bias means, and a diode rectifier connected to each of the trigger tubes, wherein the anode of each of said diode rectifiers is connected to said further bias means, wherein the cathode of each of said diode rectifiers except that connected to the trigger tube in the circuit of the first cathode of the indicating tube is connected directly to the trigger electrode of the respective associated trigger tubes, and wherein the cathode of the diode rectifier connected to the trigger tube in the circuit of the first cathode of the indicating tube is connected to the trigger electrode of its said trigger tube through a resistor.

8. An electronic counter comprising a multi-cathode cold-cathode indicating tube, a trigger tube in each cathode circuit of the indicating tube, a potential source connected across the indicating tube and the trigger tubes to cause a glow discharge between the anode and one only of the cathodes of the indicating tube and between the anode and the cathode of the trigger tube connected to that one of the indicating tube cathodes, capacitive coupling means between each cathode of the indicating tube and the trigger electrode of the trigger tube in the circuit of the next succeeding cathode of the indicating tube, means for reducing the potential across said tubes so that said glow discharges are extinguished, means for restoring said potential so that a triggering pulse is generated by current flowing over the still ionised discharge path to said one of the indicating tube cathodes and the coupling means to the trigger electrode of the trigger tube in the circuit of the cathode of the indicating tube succeeding said one cathode, means for limiting excursions of the potential of the trigger electrode for each trigger tube in the negative direction, a potential divider connected across said potential source, and a plurality of resistors each connecting the anode of a respective one of said trigger tubes to the potential divider tapping.

References Cited
UNITED STATES PATENTS 2,651,740   9/1953   Lair ________________ 315—84.6

MAYNARD R. WILBUR, *Primary Examiner.*

G. J. MAIER, *Assistant Examiner.*